April 9, 1957  V. R. BENNETT  2,787,999
RESPIRATORY VENTILATION METER
Filed Sept. 13, 1951  2 Sheets-Sheet 1
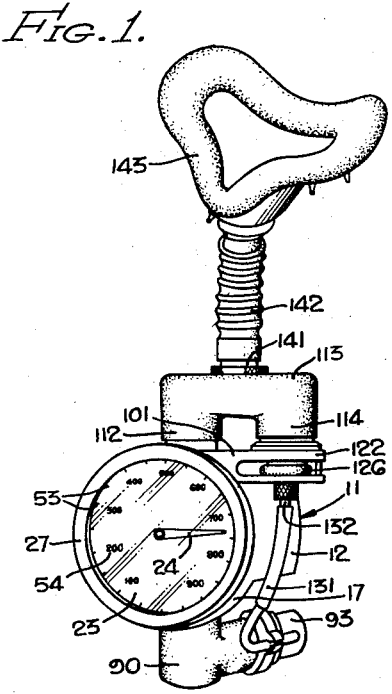
Fig. 1.
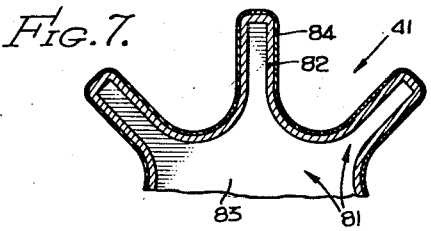
Fig. 7.
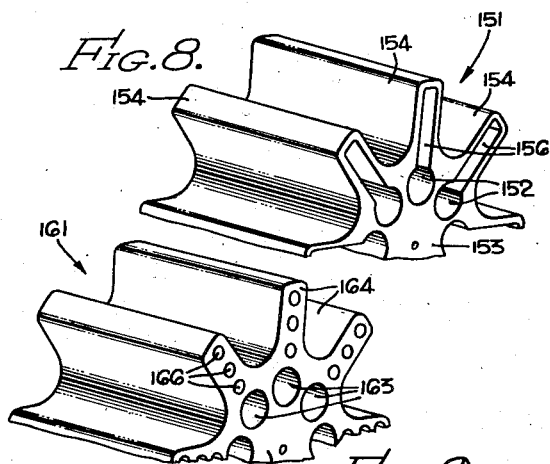
Fig. 8.
Fig. 9.
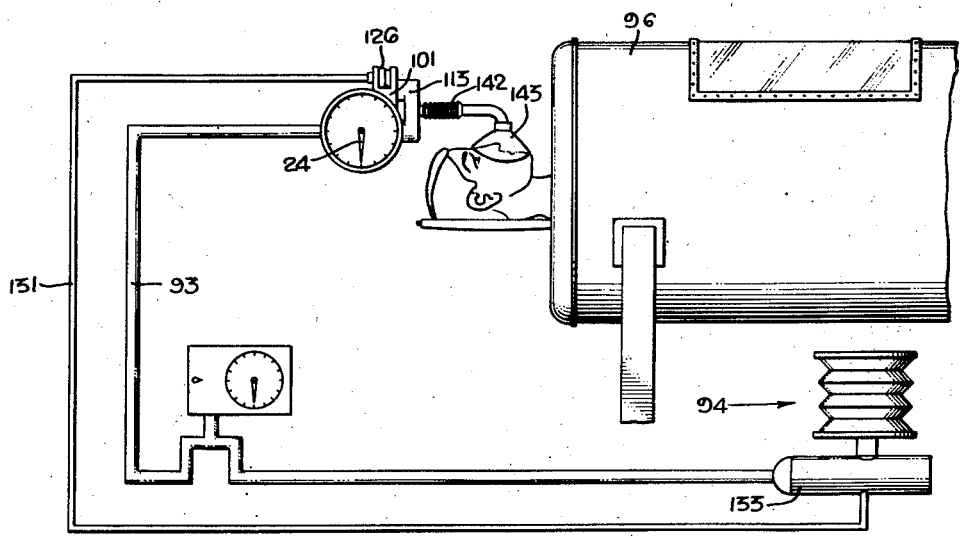
Fig. 2.
V. RAY BENNETT
INVENTOR.

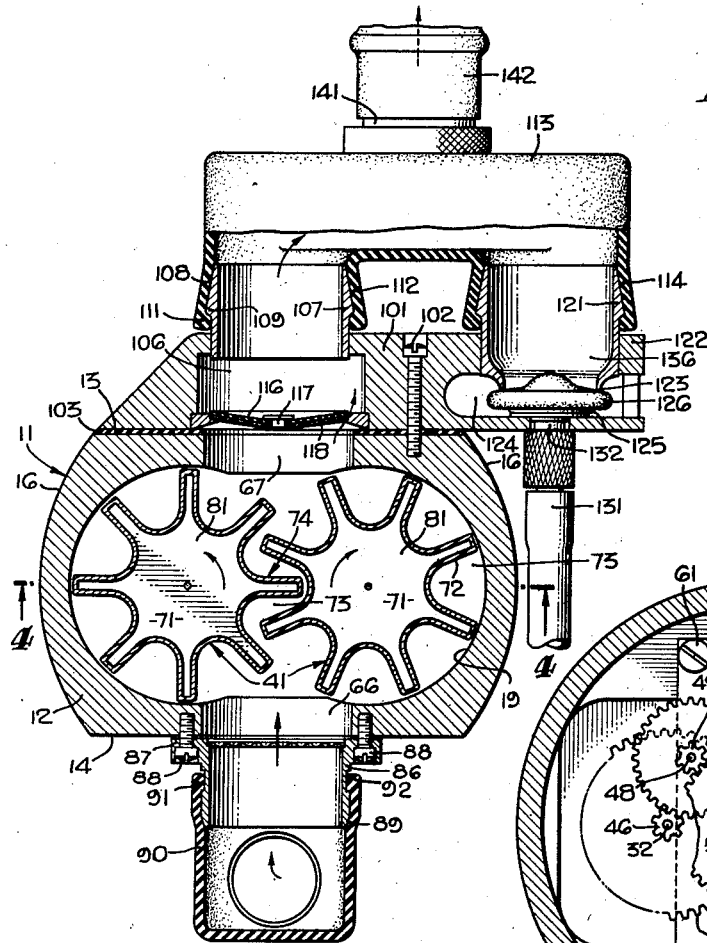
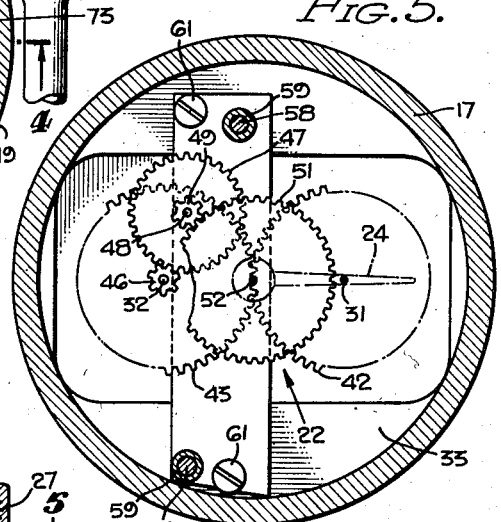
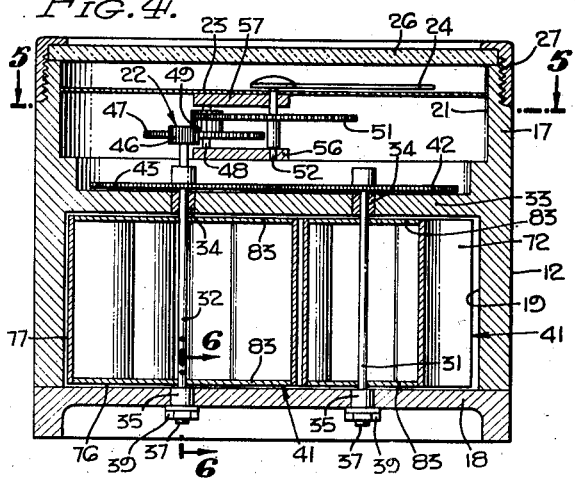
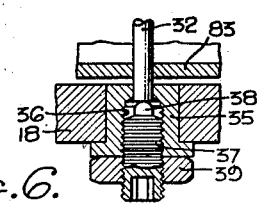
V. RAY BENNETT
INVENTOR.

United States Patent Office 2,787,999
Patented Apr. 9, 1957

2,787,999

RESPIRATORY VENTILATION METER

Vivian Ray Bennett, Los Angeles, Calif.

Application September 13, 1951, Serial No. 246,453

11 Claims. (Cl. 128—30)

This invention relates to surgical equipment, and has for an object the provision of a meter for determining the volume of breathing.

Another object of my present invention is to provide a respiratory ventilation meter which, while designed especially for use in conjunction either with the positive pressure breathing attachment for an "iron lung," constituting the subject matter of my co-pending application, Ser. No. 141,748, filed February 1, 1950, now Patent No. 2,648,331, issued August 11, 1953, or with the intermittent positive pressure breathing unit disclosed in Patent No. 2,483,722, issued to me on October 4, 1949, is useful also as an accessory to other types of artificial respiration equipment, or as an accessory to conventional anaesthesia apparatus, or, for that matter, for use alone to measure volume of natural or voluntary respiration. The meter is, therefore, adapted for use by all types of patients with respiratory involvement, in determining both actual volume of breathing and also the vital capacity of a subject.

There has been need for a respiratory ventilation meter in the care of poliomyelitis patients, especially in the cases of such patients requiring confinement within a respirator, the function of which is the artificial inducement of respiration over long periods of time during which it is imperative that proper $O_2$ and $CO_2$ values be maintained in the blood. But the perfection of a meter capable of operating efficiently in measuring the volume of respiration of such subjects has been complicated and impeded by the necessity for a high degree of accuracy of its readings which necessarily must be maintained throughout a wide range of operating conditions, in spite of the severe changes in both temperature and humidity to which its operating parts are unavoidably subjected during normal use, and in spite of the extremely small quantities often breathed by patients of low vitality.

It is a further object of the present invention, therefore, to provide a meter for measuring the volumetric flow of gas, which is small, light, and compact, and which is sensitive to and capable of measuring accurately even the very small quantities of air or other gases breathed by patients with lessened ability to breathe.

A more detailed object in this connection is the provision of a gas flow meter of the character indicated having an extremely low resistance to the flow of gas therethrough, or pressure drop, so as to assure a high degree of accuracy of its readings over a wide range of rates of flow, and also so as to offer a negligible obstruction to flow and, consequently, to present no serious interference with the breathing even of patients of very low vitality.

A further object in this same connection is to provide a meter for measuring the volumetric flow of gas, the moving parts of which are characterized by very low inertia. The importance of this is emphasized by the fact that under some conditions of respiration the meter's motors must accelerate from a standing start to speeds as high as 6000 R. P. M. in a fraction of a second, and without preventing any serious impedence to flow, and then must decelerate equally abruptly at the end of the inspiratory phase of the respiration cycle. For example, any excess mass or inertia of the meter's moving parts would cause an undesirable pressure drop to accelerate during the initial phase of the respiratory cycle, and the resultant lag would be conducive to error in the meter's reading, as would also the tendency for the rotors to continue to rotate after the flow of gas has ceased.

A more detailed object, therefore, is to provide a novel construction of rotor for a meter for measuring flow of gas, possessed of extremely low inertia characteristics.

Another object is to provide a rotor of the character described which is constructed of very light material, thereby satisfying the hereinabove mentioned requirements of low mass and inertia, and yet which presents an exterior surface capable of being machined accurately to specified dimensions within very small tolerances.

A still further object is to provide a rotor construction as described possessed of a high degree of dimensional stability, a matter which presents considerable difficulty since the meter is employed under a wide variety of operating conditions, subjecting its parts to wide changes in temperature and relative humidity, such as those encountered when the meter is used as an accessory to anaesthesia apparatus.

The problem of assuring dimensional stability is further complicated by the fact that the most suitable material from which to construct the rotors is balsa wood because of its highly favorable weight-strength ratio. The fibrous and porous nature of such material makes it especially vulnerable to the effects of moisture, evidenced by swelling as its moisture content increases. Another object of my present invention, therefore, is to compensate for such swelling of the rotors in response to increase in their moisture content, not by endeavoring to stop or limit such swelling, since experimentation has demonstrated such control to be impracticable, but by controlling the direction of expansion, and thereby assuring that it occurs at those surface areas of the rotors where dimensional stability is unimportant.

Yet another object of the invention is to provide means for connecting the meter into various types of positive pressure breathing apparatus, and to provide an exhalation valve which permits a subject to exhale into the atmosphere and not through the operating parts of the meter, thereby not only reducing the physical effort required for exhalation, but also avoiding the contamination of the interior and operating parts of the meter which otherwise would result from its use by contagious cases.

A still further object is the provision, in a respiratory ventilation meter of the character indicated, of constructional detail whereby the meter can readily have those portions apt to become contaminated when employed in the treatment of contagious cases, removed, cleaned, and sterilized, and then re-assembled with the body of the meter.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a perspective view of a respiratory ventilation meter incorporating the principles of the present invention.

Figure 2 is a diagrammatic view illustrating the manner in which the respiratory ventilation meter of Fig. 1 is operably associated with the positive pressure breathing attachment for an "iron lung" which constitutes the subject-matter of my aforementioned co-pending patent application.

Figure 3 is an enlarged view in transverse, medial, vertical section, of the meter of Fig. 1.

Figure 4 is a transverse horizontal sectional view taken upon the line 4—4 of Fig. 3 with the direction of view as indicated.

Figure 5 is a transverse vertical sectional view taken upon the line 5—5 of Fig. 4, with the direction of view as indicated.

Figure 6 is an enlarged detail view in medial section through the thrust and radial bearing for one end of one of the rotor shafts.

Figure 7 is an enlarged detail view taken through one of the impeller rotors, portions of the figure being broken away to reduce its size.

Figure 8 is a perspective view showing an alternative form of rotor construction.

Figure 9 is a perspective view showing a still further modified form of rotor construction.

Specifically describing that embodiment of my respiratory ventilation meter which presently is considered preferred, it comprises a housing 11 preferably of cast aluminum because of the favorable weight-strength ratio which characterizes this material and because of its quality of being machined easily. Preferably the housing 11 comprises a body portion 12 having flat and parallel top and bottom faces 13 and 14, respectively, and rounded ends 16. A circular flange 17 is formed, preferably integrally, on the front of the body portion 12; and the back of the housing is provided with a removable cap or cover plate 18 which serves to close a rotor chamber 19 which is formed within the body portion 12. The flange 17 also is hollow to provide a chamber 21 thereinside within which speed reduction gearing 22, a dial plate 23, and an indicating hand or pointer 24 are operably associated. The front of the recess 21 is closed by a transparent crystal 26 removably mounted upon the housing 11 as by a bezel ring 27.

A pair of shafts 31 and 32 are revolubly mounted within the housing 12 extending in spaced parallel relation across the chamber 19. Both of these shafts 31 and 32 extend through the wall 33 of the housing which separates the chamber 19 from the chamber 21, a suitable bushing 34 being provided in the wall 33 for the revoluble support of each of the said shafts. The other end of each shaft 31, 32, is revolubly supported in a bearing 35 the base of which is enlarged and threaded at its outer end, as indicated at 36 (see Fig. 6) to receive an adjustable thrust set screw 37 having a dome, or ball end 38 engaging the end of the associated shaft and thereby dispose that shaft accurately in the desired position of its axial adjustment. A lock nut 39 is carried at the outer end of each set screw 37.

Each of the shafts 31 and 32 carries a rotor or impeller 41, the constructional detail of which will be described hereinbelow. Both rotors 41 are rigidly secured to their respective shafts 31 and 32; and both shafts 31 and 32 also carry synchronizing gears 42 and 43 respectively, which are rigidly secured to shafts within the gear chamber 21, i. e., on the opposite side of the wall 33 from the rotors 41. These two gears 42 and 43 are enmeshed with each other; and, inasmuch as they are of similar design, they assure that the two shafts will rotate at the same speed and thereby synchronize the two rotors 41 with respect to each other.

One of the shafts, say the shaft 32, is elongated beyond its associated synchronizing gear 43, thus making provision for connection of the shaft 32 to the speed reduction gearing 22. For this purpose a driving gear 46 is rigidly secured to the shaft 32 within the chamber 21. This gear 46, which is of relatively small diameter and small number of teeth, enmeshes the teeth of a relatively large gear 47 rigidly secured to a shaft 48 which also has a small gear 49 rigidly secured thereto. The small gear 49 enmeshes with a large gear 51 rigid with a shaft 52 located co-axially within the gear chamber 21 and extending through the dial plate 23 to receive the indicating hand or pointer 24 upon the end of the shaft 52 thus disposed in front of the dial plate, which is provided with suitable graduation markings 53 and calibrations 54 in co-operative association therewith. The shafts 48 and 52 are journaled in suitable bearing plates 56 and 57 held in spaced parallel relationship by preferably riveted pins 58 extending through spacing bushings 59. The gear train 22 thus assembled is preferably removably mounted within the chamber 21 as by screws 61 extending through the lower plate 56 to be threaded into the metal of the housing 11. The heads of the screws 61 are made accessible through suitable openings (not shown) in the upper plate 57. Thus it may be seen that the indicating hand 24 is rotated about the axis of its supporting shaft 52 proportionately with the extent of rotation of the rotors 41 about the axes of their respective shafts 31 and 32, but at a greatly reduced rate. Therefore, the co-operating indicating pointer 24 and dial 23 may be employed to make readings of the volumetric flow of gas through the meter, the inlet and outlet ports 66 and 67, respectively, of which are so situated in the housing 11 that the rotors 41 are caused by the gas moving through the housing to rotate proportionately with the volume of the gas thus flowing, in much the same manner as in a conventional gear motor. Preferably, the ports 66 and 67 are located in coaxial alignment with each other with their common axis perpendicular to the plane which includes the two rotor shafts 31 and 32 which are spaced equidistantly in that plane on opposite sides of the ports' common axis.

Each of the two rotors 41 comprises a hub portion 71 and a plurality of vanes or blades 72 extending radially from the hub 71 a equal angular separation from each other around the periphery of the hub. The distance between the two shafts 31 and 32 is only slightly greater than the sum of the radius of the hub 71 plus the radius of the circular path described by the outer edges of the blades 72, with the result that there is always at least one blade 72 extending into the space 73 between two adjacent blades 72 of the opposite rotor, as indicated at 74 in Fig. 3, with the result that flow of gas across the rotor chamber 19 imparts rotatry motion to the rotors 41. The parts are so proportioned that the rotors 41 fit within their chamber 19 with a minimum of clearance, both at their ends, as indicated at 76, and at the outer ends of their blades 72, as indicated at 77; and the synchronizing gears 42 and 43 operate to prevent actual contact of the blades 72 of one rotor with the blades of the opposite rotor, i. e., the synchronizing gears maintain the two rotors 41 in the positions with respect to each other illustrated in Fig. 3. These details contribute to the accuracy with which the rotors 41 can be relied upon to rotate through angular distances about their respective axes proportionately with the volume of gas flowing through the rotor chamber 19 from the inlet port 66 to the outlet port 67 thereof. Also conducive toward this same end is the extremely light characteristics of the rotors 41. It will be readily apparent if they were possessed of any excess mass, their inertia would tend to introduce inaccuracies in the measurement of volumetric gas flow because of the lag which they would develop at the beginning of flow and their tendency to overrun or "coast" after flow of gas has ceased. Consequently, one of the important features of the respiratory ventilation meter of the present invention is the extremely light construction and design of the rotors 41.

With these important considerations in view, each of the rotors 41 is composed of balsa wood, the weight-strength ratio of which was found by experimentation to be superior to that of a wide variety of different materials which were employed experimentally in the development of the instrument. Each rotor is hollowed out, thus providing a hollow interior 81 not only within the hub portion 71, but also throughout the major extent of the blades 72, and leaving only a thin shell, as indicated at 82. The method of construction of the rotors which has proven most feasible involves broaching a block of the balsa wood so as to remove a solid plug in the form of the desired shape for the recess or hollow interior 81, then to shave a very thin strip from each end of the plug thus removed and cement these strips to the ends of the block, so as to close the otherwise open end of the hollow interior 81, as indicated at 83 in Fig. 4, after which the exterior surfaces, which may or may not have been roughed out previously, are finished to the desired shape and size.

However, balsa wood is possessed of two inherent characteristics which, if not successfully compensated for, would completely nullify the utility of balsa wood for the purposes of the present invention. The first of these disadvantages arises from the fact that it is necessary to machine the exterior surfaces of the rotors with a high degree of exactitude in order to maintain the close tolerances required. Being of a relatively soft fibrous and pithy nature, balsa wood does not lend itself readily to being machined in accordance with such requirements. The second disadvantage of balsa wood hereinabove referred to is its lack of dimensional stability resulting from its tendency to swell and shrink in response to changes in both temperature and humidity—this disadvantage being particularly pronounced when the material is used in an instrument of this general nature where it is subject to exposure to a wide variety of climatic changes and a wide variety of operating conditions.

In the development of the rotors of the present invention, many experiments were made in an endeavor to prevent moisture from reaching the fibers of the balsa wood and thereby prevent expansion and contraction in response to moisture changes. However, even when coated with so-called waterproofing agents to a thickness that increased the weight of the rotors far beyond that which would be considered permissible in view of the circumstances of intended use, it was found that a certain amount of moisture could still penetrate through the waterproofing and seriously impair the accuracy of the rotors' dimensions. It was finally evolved that rather than try to prohibit dimensional changes of the rotors, a rotor could be made in which the direction of dimensional change could be controlled and thereby permit expansion and contraction to occur at those surfaces of the rotor where dimensional stability is of little or no importance, rather than upon those surfaces of the rotor which are machined with great accuracy. This is accomplished by making a thin walled, hollow rotor, which has only its outer surface coated and impregnated to a shallow depth with a material which not only is substantially waterproof, but which also imparts to the fibrous balsa wood the characteristics of hardness and relative high tensile and compressive strength which make it possible to repeatedly treat and machine those surfaces with a high degree of dimensional accuracy, and also enable those surfaces to remain substantially dimensionally stable throughout the wide range of operating conditions apt to be encountered by a meter of the general type contemplated by the present invention. A phenolic resin paint known as "Phenoplast" has been employed successfully in this manner, providing a thin coating and shallow impregnation 84 of the entire exterior surface of the rotor (see Fig. 6) which impart to the exterior surface the necessary hardness and the surface texture required for good strength and accurate machinability. Rotors made according to this design have proved to be completely stable even when subjected to high relative humidity as encountered in some uses, in spite of the fact that their wall thickness is in the order of only 0.030 of an inch, except the ends which are approximately $\frac{1}{16}$ of an inch. Moisture changes to which the rotor is exposed still cause balsa wood to swell, but such swelling will occur toward the interior of the rotor since the inside fibres are completely untreated and therefore do not possess sufficient strength to prevent expansion inwardly. No such swelling occurs at the outside surfaces because of the high strength ratio of the treated exterior surfaces as compared to the untreated interior surfaces. Moreover, since the walls are thin, the forces of such swelling are minimized.

The exterior surfaces of the rotor remain unaffected by moisture and temperature changes and are therefore capable of maintaining the rotors' outside dimensions with a high degree of accuracy and dependability.

In other words, a structure has been produced which has a very high strength on the outside skin in spite of the fact that the rotor is composed of a material which is relatively soft and spongy. The internal surface of the hollow rotor construction is completely untreated and therefore has a very low strength ratio. Any swelling that occurs will be toward the point of least resistance, and since this is towards the internal part of the rotor the swelling all occurs internally rather than externally, thereby maintaining an external accuracy which is well within the required dimensional tolerances of 0.003 inch or less. The resulting rotor, with approximately twelve square inches of outside surface, weighs on the order of only two and one-half grams and is therefore characterized by an extremely low inertia value, which of course contributes to a very substantial degree to the ability of the rotors 41 to accelerate at an extremely rapid rate in response to changes in the velocity of the gas flowing through the rotor chamber 19.

Means are provided for connecting any suitable supply of gas to the housing 11 in communication with the inlet port 66 thereof. Preferably, this connecting means comprises a tubular nipple 86 having a flange 87 extending radially outwards from the base of the nipple 86, through which attaching screws 88 extend to be threaded into the housing 11 and thereby secure the nipple 86 in proper position upon the housing with its bore communicating with the inlet port 66, as illustrated in Fig. 3. Preferably the outer end of the nipple 86 is tapered slightly, as indicated at 89, to facilitate slipping a flexible and resilient adapter 90 thereupon. Preferably, a bead 91 is provided upon the inner surface of the end of the adapter 90 which is intended to be secured upon the nipple 86; and this bead is adapted to snap into a peripheral groove 92 provided in the outer surface of the nipple 86 and thereby secure the adapter firmly in position upon the nipple and yet permit ready removal of the adapter therefrom whenever occasion demands. Preferably the other end of the adapter 90 is secured to the end of a supply tube 93 such, for example, as the supply tube of an intermittent pressure breathing attachment 94 illustrated diagrammatically in Fig. 2 in operative association with a conventional "iron lung" 96. As explained in my aforementioned co-pending application, Serial No. 141,748, the function of the intermittent pressure breathing apparatus 94 is to provide air or other vital gases under intermittent positive pressure to a patient who is confined within the iron lung 96. The attachment 94 provides such gas under pressure intermittently and alternately with the pressure phase of the iron lung 96, i. e., when the pressure within the iron lung 96 is reduced, the attachment 94 provides gas under pressure to the supply tube 93 and when the pressure within the iron lung 96 is increased, the supply of gas through the pressure tube 93 by the attachment 94 is interrupted.

Means are provided for connecting a facial mask (or a tracheotomy tube if the circumstances of any individual case require use of such means for administering breathing gases to a patient) to the housing 11 in communication with the outlet port 67. A small auxiliary housing 101 is attached to the top 13 of the housing 11, as by a plurality of screws 102, preferably a suitable resilient gasket 103 being interposed between the housing 11 and the auxiliary housing 101 to insure a tight seal. A passage 106 through the auxiliary housing 101 communicates at one end with the outlet port 67 of the housing 11 and at its other end with the nipple 107 the outer end of which is provided with an external taper 108 and an annular shoulder 109, behind which the bead 111 of one of two tubular extensions 112 and 114 of a manifold 113 is adapted to engage to releasably retain the tubular extension 112 upon the nipple 107 with the bore of the nipple 107 and consequently the outlet port 67 of the housing 11 in communication with the interior passage of the manifold 113. The manifold 113 with its two tubular extensions 112 and 114 is composed of suitable resilient material such as rubber or one of the synthetic rubbers. This permits the ends of the tubular extensions to be stretched and thereby slipped over the ends of their respective nipples in order to secure the manifold in position thereupon. The tubular extension 112 is used only during the inspiratory cycle of the patient's breathing; and, in order to prevent exhalation of contaminated gases from the patient to the interior of the housing 11 I have provided a check valve 116 in the form of a very flexible soft rubber disc secured as by a rivet 117 at its center to a screen 118 extending across the discharge port 67 and secured in position by having its peripheral edges clamped between the housing 11 and the auxiliary housing 101.

The other tubular extension 114 of the manifold 113 is engaged upon a similar nipple 121 adjacent the outer end of a lateral extension 122 of the auxiliary housing 101. The end of the nipple 121 opposite that to which the tubular extension 114 of the manifold 113 is secured terminates in an annular valve seat 123 which is situated within an opening 124 of the extension 122, which is at all times in communication with the ambient atmosphere. On the opposite side of the opening 124 from the valve seat 123 a bulb 126 of highly flexible resilient material is mounted in such position that when the bulb 126 is expanded by internal pressure it moves into sealing relation with the valve seat 123. However, when pressure within the bulb 126 is released, the bulb 126 collapses sufficiently to open the port 123 and thereby establish communication between the interior of the manifold 113 and the atmosphere. A tube 131 is in communication with the interior of the bulb 126 by having its end engaged upon a nipple 132 which nipple also carries the head (not shown) over which the peripheral edges of the cap 125 are slipped to mount the bulb 126 within the opening 124. The other end of the tube 131 is in communication with the same accumulator of the intermittent pressure breathing attachment 94 as that to which the supply tube 92 is connected, with the result that whenever breathing gases under pressure are supplied to the inlet port 91 of the housing 11 under pressure as hereinabove described, the pressure tube 131 transmits substantially the same pressure to the interior of the bulb 126, causing the bulb 126 to expand and thereby sealing the port 136 through the valve seat 123. However, when the pressure within the supply tube 102', and consequently also within the pressure tube 131, is interrupted, the bulb 126 contracts and thus effectually opens the port 136, establishing substantially unrestricted communication between the interior of the manifold 113 and the ambient atmosphere.

The manifold 113 is also provided with a tubular nipple 141 the bore of which communicates with the interior of the manifold. To the outer end of this nipple 141 a flexible adapter tube 142 may be secured as a means for connecting a facial mask 143 to the manifold 113; and whereas any suitable facial mask may be employed without departing from the principles of the present invention, I prefer to use that forming the subject-matter of Patent No. 2,540,567 issued to me on February 6, 1951.

Of course the meter can be used to measure either volume of gases used in normal breathing, or to measure the vital capacity, i. e., the total quantity of air that a patient can inhale. When so used, the bulb 126 would operate merely as a check valve opened by pressure of exhaled gases within the manifold 113 during the expiratory phase of the patient's breathing, during which phase the check valve 116 associated with the inspiratory port 67 will be pressed by the pressure within the manifold 113 into its closing position upon the valve seat. This prevents flow of expired gases into the interior of the housing 11, a detail of especial importance when the meter is being used in conjunction with contagious cases. Of course, such use of the meter does not require the use of the adapter 90, the tube 131, or the associated parts shown in Figure 1.

During the inspiratory phase of the patient's breathing, the bulb 126 will be drawn into closed relation with the valve seat 123, permitting gases to be inhaled to be drawn into the manifold 113 only through the inspiratory port 67, the check valve 116 being drawn open during this phase, thus causing all of the gases to be inhaled to be drawn through the rotor chamber 19 where the passage of gases through the housing will effect rotation of the rotors 41 proportionately with their volume. This rotation of the rotors 41 will affect movement of the pointer 24 with relation to the dial 23 with the result that a reading can be obtained showing the volume of gases inspired by the patient regardless of whether reliance is placed upon fluctuation of pressure within the pressure tube 131 to open and close the bulb valve 126.

Figure 8 illustrates a modified form of rotor construction in which the rotor 151, instead of having substantially its entire interior removed to provide a single, relatively large cavity, as in the previously described modification, is provided with a plurality of relatively small hollowed-out cavities 152 extending throughout the length of the rotor 151. One such cavity 152 is formed in the hub 153 of the rotor 151 adjacent the base of each of the blades 154 of the rotor 151; and each cavity 152 has a lateral extension 156 extending radially outwards within the associated blade 154.

A further modification of rotor construction is that of the rotor 161 illustrated in Figure 9, in which the hub 162 is similarly provided with a hollowed out cavity 163 extending throughout the length of the rotor 161 adjacent the base of each of the blades 164. A series of smaller cavities 166, also extending throughout the length of the rotor 161 are drilled or otherwise formed in each of the blades 164, so arranged that their axes are parallel to each other and parallel to that of the associated larger cavity 163 at the base of the associated blade 164.

The two forms of rotor, 151 and 161, therefore are also characterized by a relatively large area of interior surface, leaving the rotor free to expand inwardly in response to temperature and humidity fluctuation, inasmuch as these interior surfaces remain untreated while the exterior surfaces of the rotor are coated and slightly impregnated with a suitable hardening and stabilizing agent such as that mentioned hereinabove in the description of the first-described form of rotor 41.

I claim:

1. In combination, positive pressure breathing apparatus including a supply of gas to be administered, a supply tube connected thereto, means for intermittently forcing gas from said supply into said supply tube at predetermined pressure, a breathing tube, means for attaching said breathing tube to a patient, and a respiratory ventilation meter comprising a housing having a chamber therein with inlet and outlet ports communicating therewith, a manifold comprising an auxiliary housing having an inspiration port and an expiration port and means providing a duct communicating with both said inspiration port and said expiration port, means for connecting said breathing tube to said manifold communicating with said duct, means for connecting said inspiration port to said outlet port, an exhalation valve associated with said exhalation port, means for connecting said supply tube to said inlet port, flow-responsive means within said chamber, and indicating means actuated by said flow-responsive means.

2. A fluid motor comprising a housing having a rotor chamber having inlet and outlet ports communicating therewith, a pair of spaced parallel shafts journaled in said housing, a rotor of light, fibrous, moisture absorbent material rigid with each of said shafts within said chamber, each of said rotors comprising a hub, blades extending radially therefrom, and a coating of material impervious to moisture and characterized by dimensional stability when machined, the distance between said shafts' axes being less than the sum of the radii of the circular paths of the outer edges of said blades whereby there is at all times at least one of the blades of one of said rotors extending into a space between blades of the other of said rotors, a pair of synchronizing gears rigid respectively with said shafts and enmeshed with each other and thereby maintaining said rotors so disposed with respect to each other that they are out of actual contact with each other, and means for measuring extent of rotation of said rotors.

3. A fluid motor comprising a housing having a rotor chamber having inlet and outlet ports communicating therewith, a pair of spaced parallel shafts journaled in said housing, a hollow rotor of light, fibrous, moisture absorbent material rigid with each of said shafts within said chamber, each of said rotors comprising a hub, blades extending radially therefrom, and a coating on exterior surfaces of said rotors, said coating being of material having a higher coefficient of dimensional stability resistant to effects of moisture and temperature variation than the material of said rotors to which it is applied, the interior surfaces of said rotors being left free of said coating material whereby said interior surfaces are free to expand and contract in response to temperature and humidity variation, the distance between said shafts' axes being less than the sum of the radii of the circular paths of the outer edges of said blades whereby there is at all times at least one of the blades of one of said rotors extending into a space between blades of the other of said rotors, a pair of synchronizing gears rigid respectively with said shafts and enmeshed with each other and thereby maintaining said rotors so disposed with respect to each other that they are out of actual contact with each other, and means for measuring extent of rotation of said rotors.

4. A fluid motor comprising a housing having a rotor chamber having inlet and outlet ports communicating therewith, a pair of spaced parallel shafts journaled in said housing, a rotor of balsa wood rigid with each of said shafts within said chamber, each of said rotors comprising a hub, blades extending radially therefrom, and a coating of material characterized by dimensional stability when machined, the distance between said shafts' axes being less than than the sum of the radii of the circular paths of the outer edges of said blades whereby there is at all times at least one of the blades of one of said rotors extending into a space between blades of the other of said rotors, a pair of synchronizing gears rigid respectively with said shafts and enmeshed with each other and thereby maintaining said rotors so disposed with respect to each other that they are out of actual contact with each other, and means for measuring extent of rotation of said rotors.

5. A fluid motor comprising a housing having a rotor chamber having inlet and outlet ports communicating therewith, a pair of spaced parallel shafts journaled in said housing, a hollow rotor of balsa wood rigid with each of said shafts within said chamber, each of said rotors comprising a hub, blades extending radially therefrom, and a coating on exterior surfaces of said rotors, said coating being of material having a higher coefficient of dimensional stability resistant to effects of moisture and temperature variation than the material of said rotors to which it is applied, the interior surfaces of said rotors being left free of said coating material whereby said interior surfaces are free to expand and contract in response to temperature and humidity variation, the distance between said shafts' axes being less than the sum of the radii of the circular paths of the outer edges of said blades whereby there is at all times at least one of the blades of one of said rotors extending into a space between blades of the other of said rotors, a pair of synchronizing gears rigid respectively with said shafts and enmeshed with each other and thereby maintaining said rotors so disposed with respect to each other that they are out of actual contact with each other, and means for measuring extent of rotation of said rotors.

6. A fluid motor comprising a housing having a rotor chamber having inlet and outlet ports communicating therewith, a pair of spaced parallel shafts journaled in said housing, a hollow rotor of balsa wood rigid with each of said shafts within said chamber, each of said rotors comprising a hub, blades extending radially therefrom, and a coating on exterior surfaces of said rotors, said coating being of phenolic resin paint having a higher coefficient of dimensional stability resistant to effects of moisture and temperature variation than the material of said rotors to which it is applied, the interior surfaces of said rotors being left free of said coating material whereby they are free to expand and contract in response to temperature and humidity variation, the distance between said shafts' axes being less than the sum of the radii of the circular paths of the other edges of said blades whereby there is at all times at least one of the blades of said rotors extending into a space between blades of the other of said rotors, a pair of synchronizing gears rigid respectively with said shafts and enmeshed with each other and thereby maintaining said rotors so disposed with respect to each other that they are out of actual contact with each other, and means for measuring extent of rotation of said rotors.

7. In combination, positive pressure breathing apparatus including a supply of gas to be administered, a supply tube connected thereto, a breathing tube, means for attaching said breathing tube to a patient, and a respiratory ventilation meter comprising a housing having a chamber therein with inlet and outlet ports communicating therewith, means for connecting said breathing tube to said outlet port, means for connecting said supply tube to said inlet port, flow-responsive means within said chamber, and gas flow indicating means operably coupled to said flow-responsive means to be actuated thereby.

8. In combination, positive pressure breathing apparatus including a supply of gas to be administered, a supply tube connected thereto to receive gas therefrom, a breathing tube, means for attaching said breathing tube to a patient, and a respiratory ventilation meter comprising a housing having a chamber therein with inlet and outlet ports communicating therewith, a manifold comprising an auxilary housing having an inspiration port and an expiration port and means providing a duct communicating with both said inspiration port and said expiration port, means for connecting said breathing tube to said manifold communicating with said duct, means for connecting said inspiration port to said outlet port, an exhalation valve associated with said exhalation port, means for connecting said supply tube to said inlet port, means within said chamber and responsive to flow of gas therethrough, and gas flow indicating means operably coupled to said flow-responsive means to be actuated thereby.

9. Breathing apparatus comprising a housing having an inlet port adapted to be connected to a source of gas to be administered and an outlet port, a manifold having an inhalation port, a breathing port, and an exhalation port, means for releasably connecting said manifold to said housing with the inhalation port communicating with said housing's outlet port, a check valve operatively associated with said outlet port permitting flow from the housing to the manifold, a breathing tube connected to said manifold in communication with said breathing port, and a valve operatively associated with said manifold's exhalation port and operative in response to pressure within the inlet port to establish communication between the breathing tube and the atmosphere.

10. A fluid motor comprising a housing having a rotor chamber and inlet and outlet ports communicating with the chamber, means for connecting a source of gas under pressure to said inlet port, a pair of spaced parallel shafts journaled on said housing, a rotor carried by each of said shafts within the chamber, each of said rotors comprising a hub and blades extending therefrom, the distance between said shafts' axes being less than the sum of the radii of the circular paths of the outer edges of said blades whereby there is at all times at least one of the blades of one of the rotors extending into a space between the blades of the other of the rotors, and means for measuring the extent of rotation of the rotors, said rotors being substantially impervious to moisture and characterized by a co-efficient of inertia so low that they are substantially instantly completely responsive to fluctuation of gas flow through said housing.

11. A fluid motor comprising a housing having a rotor chamber and inlet and outlet ports communicating with the chamber, means for connecting a source of gas under pressure to said inlet port, a pair of spaced parallel shafts journaled in said housing, a rotor rigid with each of said shafts within the chamber, each of said rotors comprising a hub and blades extending therefrom, the distance between said shafts' axes being less than the sum of the radii of the circular paths of the outer edges of said blades whereby there is at all times at least one of the blades of one of the rotors extending into a space between blades of the other of the rotors, a pair of interengaging synchronizing gears rigid respectively with said shafts and maintaining said rotors out of contact with each other, and means for measuring the extent of rotation of the rotors, said rotors being substantially impervious to moisture and characterized by a coefficient of inertia so low that they are substantially instantly completely responsive to fluctuation of gas flow through said housing.

References Cited in the file of this patent
UNITED STATES PATENTS

| | | |
|---|---|---|
| 56,614 | Roots et al. | July 24, 1866 |
| 258,535 | Kidder | May 23, 1882 |
| 620,633 | Barnum | Mar. 7, 1899 |
| 864,908 | Nebelthau | Sept. 3, 1907 |
| 1,304,607 | Schorik | May 27, 1919 |
| 1,987,760 | Sukohl | June 15, 1935 |
| 2,099,842 | Connell | Nov. 23, 1937 |
| 2,162,242 | Branower | June 13, 1939 |
| 2,190,908 | Retsema | Feb. 20, 1940 |
| 2,259,027 | Zarate et al. | Oct. 14, 1941 |
| 2,407,698 | Guibert et al. | Sept. 17, 1946 |
| 2,482,375 | Sensenich | Sept. 20, 1949 |
| 2,530,767 | Hamill | Nov. 21, 1950 |
| 2,551,653 | Wildhack | May 8, 1951 |
| 2,569,849 | Emerson | Oct. 2, 1951 |
| 2,648,331 | Bennett | Aug. 11, 1953 |

FOREIGN PATENTS

| | | |
|---|---|---|
| 469,172 | Great Britain | July 12, 1937 |